(12) United States Patent
Shimano

(10) Patent No.: US 9,175,158 B2
(45) Date of Patent: Nov. 3, 2015

(54) RESIN COMPOSITION

(71) Applicant: Sumitomo Chemical Company, Limited, Tokyo (JP)

(72) Inventor: Mitsuyoshi Shimano, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/553,299

(22) Filed: Nov. 25, 2014

(65) Prior Publication Data

US 2015/0152254 A1 Jun. 4, 2015

(30) Foreign Application Priority Data

Nov. 29, 2013 (JP) ................................. 2013-247395

(51) Int. Cl.
*C08L 23/12* (2006.01)
*C08K 3/34* (2006.01)

(52) U.S. Cl.
CPC .. *C08L 23/12* (2013.01); *C08K 3/34* (2013.01)

(58) Field of Classification Search
CPC ................................. C08L 23/12; C08K 3/34
USPC ......................................................... 524/456
See application file for complete search history.

(56) References Cited

U.S. PATENT DOCUMENTS 4,187,210 A * 2/1980 Howard, Jr. ................... 524/730
2012/0225994 A1   9/2012 Kondo

FOREIGN PATENT DOCUMENTS

| JP | 2002-003692 A | 1/2002 |
| JP | 2008-019347 A | 1/2008 |
| JP | 2011-256247 A | 12/2011 |

* cited by examiner

*Primary Examiner* — Angela C Scott
(74) *Attorney, Agent, or Firm* — Panitch Schwarze Belisario & Nadel LLP

(57) ABSTRACT

There is disclosed a resin composition from which a molded article excellent in scratch resistance and mechanical properties, low in gloss and low in shrinkage anisotropy can be obtained. Specifically, disclosed is a resin composition comprising 40% by weight to 90% by weight of a propylene polymeric material (A) containing 50% by weight or more of structural units derived from propylene, 9% by weight to 30% by weight of wollastonite (B), and 1% by weight to 30% by weight of an elastomer (C) where the combined amount of (A), (B) and (C) is taken as 100% by weight, wherein the wollastonite (B) satisfies specific requirements.

2 Claims, No Drawings

RESIN COMPOSITION

BACKGROUND OF THE INVENTION

1. Technical Field

The present invention relates to a resin composition containing prescribed ingredients.

2. Background Art

Molded articles made of propylene resin compositions are used as parts of automobiles or household electric appliances because they are excellent in mechanical properties such as impact resistance and scratch resistance.

For example, in JP-A No. 2011-256247, there is disclosed improvement in scratch resistance of a molded article made of a propylene resin composition comprising a propylene polymer, an ethylene-α-olefin random copolymer having a specific melt flow rate, a non-fibrous inorganic filler and a fibrous inorganic filler.

JP-A No. 2002-3692 discloses improvement of the scratch resistance of a molded article made of a propylene resin composition comprising a specific propylene-based block copolymer, a specific polyethylene, and a fatty acid amide.

JP-A No. 2008-19347 discloses improvement of the low-temperature impact resistance and the glossiness of a molded article made of a propylene resin composition comprising a specific propylene resin and two ethylene-α-olefin copolymer rubbers having specific densities and melt flow rates.

However, any molded articles made of the propylene resin compositions disclosed in these patent documents had room for improvement with respect to scratch resistance, mechanical properties, low gloss, and shrinkage anisotropy, which causes warping deformation.

SUMMARY OF THE INVENTION

In view of the above problems, the object of the present invention is to provide a resin composition capable of affording a molded article that is excellent in scratch resistance and mechanical properties, low in gloss, and little in shrinkage anisotropy.

The present invention relates to a resin composition comprising 40% by weight to 90% by weight of a propylene polymeric material (A) containing 50% by weight or more of structural units derived from propylene, 9% by weight to 30% by weight of wollastonite (B), and 1% by weight to 30% by weight of an elastomer (C) where the combined amount of (A), (B) and (C) is taken as 100% by weight, wherein the wollastonite (B) satisfies the following requirement (1) and requirement (2), requirement (1): having an average fiber length of 10.0 μm to 26.0 μm requirement (2): having a fiber length distribution satisfying the following (b1), (b2) and (b3) where the overall number of the wollastonite is taken as 100%, (b1): the content of wollastonite having a fiber length of 50 μm or more is 0.1% to 3.0%

(b2): the content of wollastonite having a fiber length of not less than 10 μm but less than 50 μm is 17.0% to 35.0%

(b3): the content of wollastonite having a fiber length of less than 10 μm is 62.0% to 82.9%.

According to the present invention, it is possible to provide a resin composition from which a molded article excellent in scratch resistance and mechanical properties, low in gloss and low in shrinkage anisotropy can be obtained.

DETAILED DESCRIPTION OF THE PREFERRED EMBODIMENTS

[Resin Composition]

The resin composition according to the present invention contains a propylene polymeric material (A), wollastonite (B), and an elastomer (C) in prescribed amounts, respectively.

<Propylene Polymeric Material (A)>

In the present invention, the propylene polymeric material (A) is a resin containing 50% by weight or more of structural units derived from propylene. Examples of the propylene polymeric material (A) include:

a propylene homopolymer;

a propylene copolymer comprising structural units derived from at least one comonomer selected from the group consisting of ethylene and α-olefins having 4 to 10 carbon atoms and structural units derived from propylene; and a heterophasic polymeric material which is a mixture of said propylene homopolymer and said propylene copolymer and in which the propylene copolymer is dispersed in the propylene homopolymer. Propylene polymeric materials (A) may be used either individually or in combination of two or more kinds of materials.

The content of the structural units derived from at least one comonomer selected from the group consisting of ethylene and α-olefins having 4 to 10 carbon atoms in the propylene copolymer is preferably not less than 0.01% by weight but less than 70% by weight, where the overall amount of the propylene copolymer is taken as 100% by weight. Adjusting the content of the structural units derived from at least one comonomer selected from the group consisting of ethylene and α-olefine having 4 to 10 carbon atoms to not less than 0.01% by weight makes it possible to obtain a molded article with a lower gloss.

The content of the structural units derived from at least one comonomer selected from the group consisting of ethylene and α-olefins having 4 to 10 carbon atoms is more preferably 20% by weight to 60% by weight in order to make a molded article have a lower gloss.

The content of the structural units derived from the at least one comonomer selected from the group consisting of ethylene and alpha-olefine having 4 to 10 carbon atoms in the propylene copolymer is determined from a $^{13}$C-NMR spectrum according to a report produced by Kakugo at al. (Macromolecules 1982, 15, 1150-1152).

Examples of the α-olefins having 4 to 10 carbon atoms of the above-mentioned comonomer include butane, hexene, and octene; butene is preferred.

Specific examples of the propylene copolymer include a propylene-ethylene copolymer, a propylene-1-butene copolymer, a propylene-1-hexene copolymer, a propylene-1-octene copolymer, a propylene-ethylene-1-butene copolymer, a propylene-ethylene-1-hexene copolymer, and a propylene-ethylene-1-octene copolymer; a propylene-ethylene copolymer or a propylene-ethylene-1-butene copolymer is preferred. The propylene copolymer may be either a random copolymer or a block copolymer.

The melt flow rate of the propylene polymeric material (A) at 230° C. and a load of 21.18 N as measured in accordance with JIS K7210 is preferably 1.0 g/10 minutes or more from the viewpoint of improving the flowability of the resin composition and it is preferably 200 g/10 minutes from the viewpoint of improving the tensile elongation and the surface impact resistance of a molded article. The melt flow rate is more preferably 10 g/10 minutes to 150 g/10 minutes, and even more preferably 20 g/10 minutes to 120 g/10 minutes.

The intrinsic viscosity [η] of the propylene homopolymer in the propylene polymeric material (A) is preferably 0.70 dl/g to 3.0 dl/g. By adjusting the intrinsic viscosity to such a range, it is possible to improve the flowability of the resin composition and the tensile elongation and the surface impact resistance of a molded article.

The intrinsic viscosity [η] of the propylene copolymer in the propylene polymeric material (A) is preferably 2 dl/g to 8 dl/g. By adjusting the intrinsic viscosity to such a range, it is possible to improve the tensile elongation and the surface impact resistance of a molded article.

Regarding an intrinsic viscosity [η], a reduced viscosity is first measured at three concentrations of 0.1 g/dl, 0.2 g/dl and 0.5 g/dl in Tetralin as a solvent at a temperature of 135° C. by using an Ubbelohde's viscometer. Then, an intrinsic viscosity is determined using the calculation method described in "Kobunshi Yoeki (Polymer Solution), Kobunshi Jikkengaku (Polymer Experiment Study) Vol. 11" page 491 (published by Kyoritsu Shuppan Co., Ltd., 1982), specifically, by an extrapolation method in which reduced viscosities are plotted against concentrations and the concentration is extrapolated in zero.

The content of the propylene polymeric material (A) is preferably 40% by weight or more from the viewpoint of rendering a molded article low in gloss, a molded article low in shrinkage anisotropy, and good in scratch resistance and tensile elongation and also is preferably 90% by weight or less from the viewpoint of rendering a molded article low in gloss, where the combined amount of the propylene polymeric material (A), the wollastonite (B), and the elastomer (C) is taken as 100% by weight. The content of the propylene polymeric material (A) is more preferably 45% by weight to 85% by weight, and even more preferably is 50% by weight to 80% by weight.

The propylene polymeric material (A) can be produced by a publicly known polymerization method using a polymerization catalyst. Examples of the polymerization catalyst include Ziegler type catalyst systems, Ziegler-Natta catalyst systems, catalyst systems each comprising a compound of a transition metal of Group 4 of the periodic table having a cyclopentadienyl ring and an alkyl aluminoxane, and catalyst systems each comprising a compound of a transition metal of Group 4 of the periodic table having a cyclopentadienyl ring, a compound capable of reacting with the transition metal compound to form an ionic complex, and an organoaluminum compound.

Preliminarily polymerized catalysts which are prepared by preliminarily polymerizing ethylene or an m-olefin in the presence of the aforementioned catalyst systems may also be used. Examples of these catalyst systems include the catalyst systems disclosed in JP-A-61-218606, JP-A-61-287904, JP-A-5-194685, JP-A-7-216017, JP-A-9-316147, JP-A-10-212319, and JP-A-2004-182981.

Examples of the polymerization method include bulk polymerization, solution polymerization, slurry polymerization, or vapor phase polymerization. The bulk polymerization is a method in which polymerization is carried out using, as a medium, an olefin that is liquid at the polymerization temperature; both the solution polymerization and the slurry polymerization are methods by which polymerization is carried out in an inert hydrocarbon solvent such as propane, butane, isobutane, pentane, hexane, heptane, and octane; the vapor phase polymerization is a method in which a gaseous monomer is used as a medium and a gaseous monomer is polymerized in the medium. These polymerization methods can be carried out either in a batch system or in a continuous system, and such polymerization methods can be combined optionally. From the industrial and economical point of view, a production method by a continuous vapor phase polymerization method or by a bulk-vapor phase polymerization method in which a bulk polymerization method and a vapor phase polymerization method are performed continuously is preferred.

The conditions in the polymerization step (e.g., polymerization temperature, polymerization pressure, monomer concentration, input amount of catalyst, and polymerization time) may be determined appropriately.

The method for producing of a heterophasic polymeric material as the propylene-based polymeric material (A) is preferably a multistage polymerization method, that is, a method in which a propylene homopolymer is produced by polymerizing propylene in a first polymerization step and then propylene and at least one comonomer selected from the group consisting of ethylene and α-olefins having 4 to 10 carbon atoms are copolymerized in a second polymerization step in the presence of the propylene homopolymer produced in the first step.

The isotactic pentad fraction measured by $^{13}$C-NMR of the propylene homopolymer as the propylene polymeric material (A) or the portion formed by homopolymerization of propylene of the heterophasic polymeric material (the portion produced by propylene homopolymerization) is preferably 0.95 or more, and more preferably 0.98 or more.

The isotactic pentad fraction is the molar fraction of propylene monomer units located at the centers of isotactic sequences in pentad units in a propylene polymer molecule chain, in other words, the fraction of propylene monomer units located in sequences in which five successively meso-bonded propylene monomer units (hereinafter represented by mmmm). The method for measuring the isotactic pentad fraction is the method disclosed by A. Zambelli et al. in Macromolecules, 6, 925 (1973), namely, a method in which the fraction is measured by $^{13}$C-NMR.

Specifically, the ratio of the NMR peak area assigned to mmmm to the area of the absorption peaks within the methyl carbon region measured by $^{13}$C-NMR spectroscopy is the isotactic pentad fraction.

<Wollastonite (B)>

The wollastonite (B) of the present invention satisfies the following requirement (1) and requirements (2), requirement (1): having an average fiber length of 10.0 μm to 26.0 μm requirement (2): having a fiber length distribution satisfying the following (b1), (b2) and (b3), (b1): the content of wollastonite having a fiber length of 50 μm or more is 0.1% to 3.0%

(b2): the content of wollastonite having a fiber length of not less than 10 μm but less than 50 μm is 17.0% to 35.0%

(b3): the content of wollastonite having a fiber length of less than 10 μm is 62.0% to 82.9%.

By using wollastonite (B) satisfying the above requirement (1) and requirement (2), it is possible to make a molded article have a reduced gloss, improve the scratch resistance, the tensile elongation, and the surface impact resistance of a molded article, and reduce the shrinkage anisotropy of a molded article.

The content of wollastonite in each of (b1), (b2), and (b3) is a value calculated when the number of all wollastonite contained in the resin composition of the present invention is taken as 100%.

In the requirement (1), the average fiber length is preferably 13 μm to 25 μm, more preferably 15 μm to 20 μm.

In the requirement (2), the fiber length distribution preferably satisfies the following (b1)', (b2)' and (b3)', (b1)': the content of wollastonite having a fiber length of 50 μm or more is 0.2% to 2.5%

(b2)': the content of wollastonite having a fiber length of not less than 10 μm but less than 50 μm is 22.0% to 31.0%

(b3)': the content of wollastonite having a fiber length of less than 10 μm is 67.5% to 77.8%.

The fiber length distribution more preferably satisfies the following (b1)", (b2)" and (b3)", (b1)": the content of wollastonite having a fiber length of 50 μm or more is 0.4% to 2.0%

(b2)": the content of wollastonite having a fiber length of not less than 10 μm but less than 50 μm is 27.6% to 30.5%

(b3)": the content of wollastonite having a fiber length of less than 10 μm is 68.5% to 72.0%.

The average fiber diameter of the wollastonite (B) of the present invention is preferably 3.0 μm to 4.5 μm, more preferably 3.1 μm to 4.0 μm.

By adjusting the average fiber diameter of the wollastonite (B) to 3.1 μm or more, it is possible to reduce the shrinkage anisotropy of a molded article, whereas by adjusting to 4.0 μm or less, it is possible to increase the tensile elongation of a molded article.

In the present invention, the average fiber length and the fiber length of the wollastonite (B) are measured using an image obtained by ashing a molded article made of the resin composition of the present invention at 550° C. and observing the resulting ash with a scanning electron microscope.

The fiber length distribution of the wollastonite (B) is a parameter obtained by classifying the wollastonite measured by the above-described method into the following (a) through (c), and the percentage of the number of the fibers of each of (a) through (C) relative to the number of all of the wollastonite.

(a): wollastonite being 50 μm or more in fiber length (b): wollastonite being not less than 10 μm but less than 50 μm in fiber length (c): wollastonite being less than 10 un in fiber length.

The wollastonite (B) may be commercially available one. Examples of commercially available wollastonite (B) include products available under the trade names of NYAD and NYGLO from NYCO minerals.

The wollastonite (B) may have been treated on its surface with a surface treating agent, such as an acid-modified polyolefin and a silane coupling agent. Examples of the method of treating the wollastonite (B) with a surface treating agent include a method of applying a surface treating agent to the wollastonite (B) with a spray and a method of adding a surface treating agent at the time of melt-kneading the propylene polymeric material (A), etc., and then bringing the agent into contact with the wollastonite (B).

The content of the wollastonite (B) in the resin composition of the present invention is preferably 9% by weight to 30% by weight and is more preferably 10% by weight to 26% by weight where the combined amount of the propylene polymeric material (A), the wollastonite (B) and the elastomer (C) is taken as 100% by weight. By adjusting the content of the wollastonite (B) to 9% by weight or more, it is possible to render a molded article lower in gloss and better in scratch resistance, and by adjusting the content of the wollastonite (B) to 30% by weight or less, it is possible to render the tensile elongation better.

<Elastomer (C)>

The elastomer (C) is a polymeric material that exhibits rubber-like elasticity at near room temperature. The elastomer (C) includes at least one elastomer selected from the group consisting of olefin-based elastomers and vinyl aromatic compound elastomers.

Olefin-based elastomers are copolymers each having structural units derived from ethylene and structural units derived from an α-olefin having 4 to 20 carbon atoms. The content of the structural units derived from ethylene in an olefin-based elastomer is preferably 50% by weight or more where the sum total of the content of the structural units derived from ethylene and the content of the structural units derived from an α-olefin having 4 to 20 carbon atoms is taken as 100% by weight.

Examples of the α-olefin having from 4 to 20 carbon atoms include 1-butene, isobutene, 1-pentene, 2-methyl-1-butene, 3-methyl-1-butene, 1-hexene, 2-methyl-1-pentene, 3-methyl-1-pentene, 4-methyl-1-pentene, 1-octene, 1-nonene, 1-decene, 1-undecene, and 11-dodecene. These may be used either individually or in combination of two or more kinds thereof. Preferred is 1-butene, 1-hexene, or 1-octene.

The density of the olefin-based elastomer measured in accordance with JIS K7112 is preferably 0.85 g/cm$^3$ to 0.885 g/cm$^3$ from the viewpoint of improving the surface impact resistance of a molded article, more preferably 0.85 g/cm$^3$ to 0.88 g/cm$^3$, and even more preferably 0.855 g/cm$^3$ to 0.875 g/cm$^3$.

The melt flow rate of the olefin-based elastomer measured at 230° C. under a load of 21.18 N in accordance with JIS K6758 is 0.05 g/10 minutes to 30 g/10 minutes and is preferably 0.2 g/10 minutes to 15 g/10 minutes from the viewpoint of rendering good the surface impact resistance of a molded article and the viewpoint of making a molded article to have a low gloss. From the viewpoint of making a molded article have a low gloss, the melt flow rate is more preferably 0.5 g/10 minutes to 5 g/10 minutes.

An example of the method of producing the olefin-based elastomer is a method of producing it using a polymerization catalyst. Examples of the polymerization catalyst include Ziegler-Natta catalysts comprising a vanadium compound, an organoaluminum compound and a halogenated ester compound, catalysts comprising a combination of an alumoxane or boron compound with a metallocene compound composed of a titanium, zirconium or hafnium atom coordinated with a group having at least one cyclopentadienyl anion skeleton, and so-called metallocene catalysts.

Examples of the polymerization method include a method in which ethylene and an α-olefin are copolymerized in an inert organic solvent such as a hydrocarbon compound and a method in which ethylene and an α-olefin are copolymerized therein without using any solvent.

The vinyl aromatic compound elastomer is an elastomer produced by polymerizing a vinyl aromatic compound.

Examples of the vinyl aromatic compound elastomer include a block copolymer comprising structural units derived from a vinyl aromatic compound and structural units derived from a conjugated diene, or a block copolymer in which double bonds of conjugated diene parts of said block copolymer have been hydrogenated.

As the vinyl aromatic compound-containing elastomer, a block polymer in which double bonds of conjugated diene parts of a block copolymer comprising structural units derived from a vinyl aromatic compound and structural units derived from a conjugated diene have been hydrogenated is preferred, a block polymer in which 80% or more of the double bonds of conjugated diene parts of a block copolymer have been hydrogenated is more preferred, and it is even more preferred to use a block copolymer in which 85% or more of the double bonds have been hydrogenated. These may be used either indifically or in combination of two or more thereof.

An exemplary vinyl aromatic compound in the vinyl aromatic compound elastomer is styrene.

Examples of the block polymer comprising structural units derived from a vinyl aromatic compound and structural units derived from a conjugated diene include a styrene-ethylene-butene-styrene elastomer (SEBS), a styrene-ethylene-propylene-styrene elastomer (SEPS), a styrene-butadiene elastomer (SBR), a styrene-butadiene-styrene elastomer (SBS), and a styrene-isoprene-styrene elastomer (SIS).

The content of the structural units derived from a vinyl aromatic compound in the vinyl aromatic compound elastomer is preferably 10% by weight to 70% by weight, more preferably 11% by weight to 50% by weight, and even more preferably 12% by weight to 30% by weight, where the overall amount of the vinyl aromatic compound elastomer is taken as 100% by weight.

The density of the vinyl aromatic compound elastomer measured in accordance with JIS K7112 is preferably 0.88 g/cm$^3$ to 0.99 g/cm$^3$ from the viewpoint of improving the surface impact resistance of a molded article, more preferably 0.88 g/cm$^3$ to 0.94 g/cm$^3$, and even more preferably 0.89 g/cm$^3$ to 0.91 g/cm$^3$.

The melt flow rate of the vinyl aromatic compound elastomer measured at 230° C. and a load of 21.18 N in accordance with JIS K6758 is preferably 0.1 g/10 minutes to 15 g/10 minutes, and more preferably 1 g/10 minutes to 13 g/10 minutes. As to the molecular weight distribution of the vinyl aromatic compound elastomer, the molecular weight distribution (Q value) calculated from a weight average molecular weight (Mw) and a number average molecular weight (Mn) measured by gel permeation chromatography (GPC) is preferably 2.5 or less, and more preferably 2.3 or less.

One exemplary method for producing the vinyl aromatic compound elastomer is a method in which a conjugated diene, a vinyl aromatic compound and optionally an olefin are polymerized in a hydrocarbon solvent.

When the combined amount of the propylene polymeric material (A), the wollastonite (B) and the elastomer (C) is taken as 100% by weight, the content of the elastomer (C) in the resin composition of the present invention is preferably 1% by weight or more from the viewpoint of improving the surface impact resistance and the tensile elongation of a molded article and also is preferably 30% by weight or less from the viewpoint of improving the scratch resistance of a molded article and the processability of a resin composition, and is more preferably 5% by weight to 25% by weight.

The resin composition of the present invention may contain an inorganic filler other than the wollastonite (B). As the inorganic filler, there can be used an inorganic filler in any form, such as a needle-like form, a powdery form, a flaky form, and a granular form, talc is preferable as the inorganic filler to be used in combination from the viewpoint of achieving good processability of a resin composition and achieving satisfactory rigidity and good appearance of a molded article.

The content of talc in the resin composition of the present invention is preferably the same as or less than that of the wollastonite (B) from the viewpoint of making a molded article have a low gloss and rendering good the scratch resistance of a molded article.

The average particle diameter of talc is preferably 3 μm to 8 μm. The "average particle diameter" as referred to in the present invention means a 50% equivalent particle diameter D50 determined from an integral distribution curve of the sub-sieve method produced on the basis of values measured by a laser diffraction method using a particle size analyzer after putting a sample in an ethanol solution and conducing dispersion for minutes with an ultrasonic cleaner.

The resin composition of the present invention may contain a lubricant. While examples of the lubricant include oleamide, behenamide and erucamide, erucamide is preferable from the viewpoint of achieving good scratch resistance of a molded article.

The content of the lubricant is preferably 0.1 parts by weight or more from the viewpoint of achieving good scratch resistance of a molded article and also is preferably 0.6 parts by weight or less from the viewpoint of preventing the surface of a molded article from deterioration in appearance where the combined amount of the propylene polymeric material (A), the wollastonite (B), and the elastomer (C) is taken as 100 parts by weight.

The resin composition of the present invention may optionally contain publicly known additives other than the inorganic filler and the lubricant. Examples of such additives include neutralizers, adsorbents, antioxidants, nucleating agents, UV absorbers, antistatic agents, antiblocking agents, processing aids, organic peroxides, coloring agents (inorganic pigments, organic pigments, pigment dispersants, etc.), plasticizers, flame retardants, antibacterial agents, and light-diffusing agents. Such additives may be used independently or may be used in combination of two or more thereof.

<Method for Producing Resin Composition>

The resin composition is produced by a method in which the propylene polymeric material (A), the wollastonite (B), the elastomer (C), and optionally an inorganic filler, a lubricant, an additive, etc. are mixed uniformly with a Henschel mixer, a tumbler, or the like and then fed into a twin screw extruder or they are fed separately into a twin screw extruder, and then they are melt-kneaded with the twin screw extruder.

Usually, since a fibrous filler like the wollastonite (B) is broken during melt-kneading to have a short fiber length, it is less effective to impart rigidity or strength to a molded article. For this reason, there is used a method in which a kneading machine with a plurality of raw material feed ports formed along its longitudinal direction is used, the resin components are fed through the most upstream port and plasticized, and then a fibrous filler is fed through a downstream port, so that fibers are prevented from breaking. When all the raw materials are fed through one port, it is common in the conventional methods to knead them at a temperature of 200° C. or more in order to make the plasticization of a resin faster and at the same time make the viscosity of a molten resin lower, thereby minimizing the breakage of fibers.

The average fiber length and the fiber length distribution of the wollastonite (B) can be adjusted by the following methods (I) to (III):

(I) a method of adjusting them by pulverizing feedstock wollastonite in a dry system or a wet system with a pulverizer, such as a ball mill, (II) a method of adjusting them by controlling the revolution speed and the stirring time when stirring the propylene polymeric material (A), etc., with a mixing machine such as a Henschel mixer, (III) a method of controlling the kneading temperature, etc. when kneading the propylene polymeric material (A), etc. with a twin screw kneading extruder, or the like.

Of these methods, it is preferable to use method (III) in order to achieve good production efficiency.

In the above method (III), it is possible to control the average fiber length and the fiber length distribution of the wollastonite (B) specifically by combining conditions such as the method of feeding raw material components, the temperature of the kneading machine, the screw shape, the discharge rate, and the screw rotation speed.

As the method of feeding the raw material components, a method of feeding all the components through the most upstream port of the kneading machine is preferable. This method makes wollastonite easier to break and therefore it becomes easier to adjust the average fiber length and the fiber length distribution of the wollastonite (B).

The temperature (preset temperature) of the kneading machine is preferably not lower than 140° C. but lower than 170° C. and is more preferably 145° C. to 169° C. It becomes easier to control the average fiber length and the fiber length distribution of the wollastonite (B) by adjusting the temperature to within the above range.

The screw configuration may be determined so that the wollastonite (B) may have a prescribed average fiber length and a prescribed fiber length distribution. For example, in a kneading zone located on the most upstream side within the twin screw kneading machine, the fiber length can be shorten by making the combination of kneading discs to be a combination of an R type, an R type, an N type and an L type viewed from the upstream side and thereby elongating the stay of raw materials and increasing the frequency of passing of the raw materials through a clearance between the kneading discs and the barrel of the kneading machine.

Preferably, the discharge rate and the screw rotation speed are determined appropriately together with the preset temperature and the screw configuration. When the discharge rate is reduced or when the screw rotation speed is increased, fibers of the wollastonite (B) tend to break easily.

Examples of the kneading machine to be used for the production of the resin composition of the present invention include a twin screw co-rotating extruder (e.g., TEM [registered trademark] manufactured by Toshiba Machine Co., Ltd., TEX [registered trademark] manufactured by Japan Steel Works, Ltd.), and a twin screw counter-rotating extruder (e.g., FCM [registered trademark] manufactured by Kobe Steel, Ltd. and CMP [registered trademark] manufactured by The Japan Steel Works, Ltd.).

Molded articles made of the resin composition of the present invention are used for parts of automobiles, parts of household electric appliances, and containers, for example. Examples of the parts of automobiles include a door trim, a pillar, an instrument panel, and a bumper, an instrument panel is preferable.

Examples of the method for producing a molded article made of the resin composition of the present invention include publicly known molding methods. Examples of such publicly known molding methods including an injection molding method, a blow molding method, a press molding method, a vacuum forming method, and an extrusion forming method; an injection molding method is preferred because of its high production efficiency.

Examples of the injection molding method include an injection foam molding method, a supercritical injection foam molding method, an ultra high-speed injection molding method, an injection compression molding method, a gas-assisted injection molding method, a sandwich injection molding method, and a film insert injection molding method.

EXAMPLES

The present invention is described with reference to Examples and Comparative Examples below. The raw materials used in Examples and Comparative Examples are shown below.
(1) Propylene Polymeric Material (A)
(A-1) Heterophasic Polymeric Material
Using a polymerization catalyst prepared by the method disclosed in Example 1 of JP 2009-167407 A, a propylene homopolymer was produced in an earlier step, and then a propylene-ethylene copolymer was produced in a later step. Thus, a heterophasic polymeric material (A-1) having the following properties was obtained.
MFR (measured at 230° C. and 21.18 N-load): 55 g/10 minutes
Intrinsic viscosity $[\eta]p$ of propylene homopolymer: 0.89 dl/g
The amount of propylene-ethylene copolymer: 13% by weight
The amount of ethylene in propylene-ethylene copolymer: 32% by weight
Intrinsic viscosity $[\eta]ep$ of propylene-ethylene copolymer: 6 dl/g
(A-2) Heterophasic Polymeric Material
Using a polymerization catalyst prepared by the method disclosed in Example 1 of JP 2009-167407 A, a propylene homopolymer was produced in an earlier step, and then a propylene-ethylene copolymer was produced in a later step. Thus, a heterophasic polymeric material (A-2) having the following properties was obtained.
MFR (measured at 230° C. and 21.18 N-load): 55 g/10 minutes
Intrinsic viscosity $[\eta]p$ of propylene homopolymer: 0.87 dl/g
The amount of propylene-ethylene copolymer: 35% by weight
The amount of ethylene in the amount of propylene-ethylene copolymer: 53% by weight
Intrinsic viscosity $[\eta]ep$ of propylene-ethylene copolymer: 3.0 dl/g
(A-3) Propylene Homopolymer
(Commercial name) Sumitomo NOBLEN R101, produced by Sumitomo Chemical Co., Ltd.
MFR (measured at 230° C. and 21.18 N-load): 20 g/10 minutes
Intrinsic-viscosity $[\eta]p$: 1.34 dl/g
(A-4) Propylene Homopolymer
(Commercial name) Sumitomo NOBLEN U501E1, produced by Sumitomo Chemical Co., Ltd.
MFR (measured at 230° C. and 21.18 N-load): 100 q/10 minutes
Intrinsic-viscosity $[\eta]p$: 0.9 dl/g
(2) Wollastonite (B)
(Registered trademark) NYGLOS8 (produced by NYCO minerals)
(3) Elastomer (C)
(C-1) Ethylene-Octene Random Copolymer
(Commercial name) ENGAGE EG8150 (produced by Dow Chemical Japan)
Density: 0.871 g/cm$^3$
MFR (measured at 230° C. and 21.18 N-load): 1.1 g/10 minutes
(C-2) Ethylene-Butene Random Copolymer
(Commercial name) ENGAGE EG7387 (produced by Dow Chemical Japan)
Density: 0.872 g/cm$^3$
MFR (measured at 230° C. and 21.18 N-load): 0.5 g/10 minutes
Talc-1: talc produced by Hayashi-Kasei Co., Ltd.; average particle diameter: 5 μm
Talc-2: talc produced by Hayashi-Kasei Co., Ltd.; average particle diameter: 6 μm
Fibrous magnesium oxysulfate
(Commercial name) MOS-HIGEA (produced by Ube Material Industries, Ltd.)
Glass fiber (chopped strand), (commercial name) TP480 (produced by Nippon Electric Glass Co., Ltd.)
Lubricant: fatty acid amide
(Commercial name) NEUTRON-S (produced by Nippon Fine Chemical Co., Ltd.)
Chemical name: erucamide Neutralizer
Calcium stearate (produced by NOF Corporation)
    Antioxidant 1
(Commercial name) SUMILIZER GA80 (compound name: 3,9-bis[2-(3-(3-tert-butyl-4-hydroxy-5-methylphenyl)propionyloxy)-1,1-dimethylethyl]-2,4,8,10-tetraoxaspiro[5,5] undecane, produced by Sumitomo Chemical Co., Ltd.)
    Antioxidant 2
(Commercial name) SONGNOX 6260 (compound name: bis (2,4-di-tert-butylphenyl)pentaerythritol diphosphite), produced by Songwon)
    Antioxidant 3
(Commercial name) SUMILIZER TPM (compound name: dimyristyl-3,3'-thiopropionate, produced by Sumitomo Chemical Co., Ltd.)
    Light stabilizer
(Commercial name) Uvinul 5050H (a mixture of oligomeric compounds which are the formal condensation product of 4-amino-2,2,6,6-tetramethylpiperidine and octadecene-1-maleic anhydride copolymer; produced by BASF)
    Additive Ethylenebis(stearamide)
(Commercial name) Armowax EBS (produced by Lion Corporation)
    Pigment masterbatch
(Commercial name) OKB152 (black masterbatch produced by Toyo Color Co., Ltd.)

Physical properties of raw material components and propylene polymer components were measured by the following methods.

(1) Melt Flow Rate (MFR; Unit: g/10 min.)

Melt flow rate was measured by the method provided in JIS K7210. The measurement temperature was 230° C. and the load was 21.18 N.

(2) Intrinsic Viscosity ([η], Unit: dl/g)

A reduced viscosity was first measured at three concentrations of 0.1 g/dl, 0.2 g/dl and 0.5 g/dl in Tetralin as a solvent at a temperature of 135° C. by using an Ubbelohde's viscometer. Then, an intrinsic viscosity was determined using the calculation method described in "Kobunshi Yoeki (Polymer Solution), Kobunshi Jikkengaku (Polymer Experiment Study) Vol. 11" page 491 (published by Kyoritsu Shuppan Co., Ltd., 1982), specifically, by an extrapolation method in which reduced viscosities are plotted against concentrations and the concentration is extrapolated in zero.

(3) Average Fiber Length of Wollastonite (Unit: μm)

Three grams of a molded article was put into a crucible and ashed at 550° C. for 1 hour, then the ashed material was applied to a sample table, Au was vapor deposited thereon, and then the average fiber length of the wollastonite (B) was observed with a SEM (a scanning electron microscope: S-4800 manufactured by Hitachi High-Technologies Corporation). This SEM image was captured into an image analyzer (LUZEX-AP manufactured by Nireco), and the fiber length of the wollastonite in the SEM image was measured. The fiber length of wollastonite was measured from both ends. The average fiber length was calculated using the following formula (I).

$$\text{Average fiber length} = \Sigma(nL^2)/\Sigma(nL) \quad \text{Formula (I)}$$

n: the number of the fibers measured, L: the fiber length measured (4) Fiber Length Distribution of Wollastonite All the fibers measured in the above (3) were classified into the following (a) through (c), and the percentage of the number of the fibers of each of (a) through (c) relative to 100% of the number of all of the wollastonite was calculated.

(a): wollastonite being 50 μm or more in fiber length
(b): wollastonite being not less than 10 μm but less than 50 μm in fiber length
(c): wollastonite being less than 10 μm in fiber length.

(5) Average Fiber Diameter of Wollastonite (Unit: μm)

Regarding the fiber diameter of wollastonite, a SEM image obtained by the same method as that used for the average fiber length was captured into an image analyzer (LUZEX-AP manufactured by Nireco), and then the fiber diameter of the wollastonite in the SEM image was measured. The average fiber diameter was calculated using the following formula (II).

$$\text{Average fiber diameter} = \Sigma(nD^2)/\Sigma(nD) \quad \text{Formula (II)}$$

n: the number of the fibers measured, D: the fiber diameter measured (6) Gloss on Specular Surface, Gloss on Grained Surface (%)

Injection molding was carried out under conditions including a molding temperature of 220° C. and a mold cooling temperature of 50° C. by using an SE180D type injection molding machine manufactured by Sumitomo Heavy Industries, and thus there was produced a rectangular prism specimen being 400 mm in length, 100 mm in width and 3 mm in thickness (having a 400 mm×100 mm front surface with a grain pattern (i.e., a grained surface) and a 400 mm×100 mm rear specular surface). This specimen was allowed to stand for 48 hours under a standard condition represented by a room temperature of 23° C. and a humidity of 50%, and then a gloss was measured at an angle of 600 for the specular surface and the grained surface by using a micro-TRI-gloss (portable gloss meter) manufactured by BYK-Gardner. The smaller the value of gloss, the lower the gloss.

(7) Scratch Resistance (Unit: %)

Injection molding was carried out under conditions including a molding temperature of 220° C. and a mold cooling temperature of 50° C. by using an SE180D type injection molding machine manufactured by Sumitomo Heavy Industries, and thus there was produced a rectangular prism specimen being 400 mm in length, 100 mm in width and 3 mm in thickness (having a 400 mm×100 mm front surface with a grain pattern (i.e., a grained surface) and a 400 mm×100 mm rear specular surface).

Using a scratch testing machine Scratch 4 manufactured by Surface Machine System, a gloss was measured by rubbing a friction block (shapes R5, 12 mm in width) against the grained surface of the specimen 10 times under conditions including a load of 29 N and a speed of 28 cm/sec. The smaller the value of gloss, the better scratch resistance.

(8) Tensile Elongation (Unit: %)

A #1 tensile test piece disclosed in JIS K7113 was molded at a molding temperature of 200° C. and a mold temperature of 40° C. by using an injection molding machine M70 manufactured by Meiki Co., Ltd., and the tensile elongation thereof was measured until it broken under a 23° C. atmosphere at a tensile speed of 50 mm/min.

The tensile elongation (%) was defined and determined as a rate relative to 115 mm, which is the distance between chucks.

(9) High Rate Surface Impact Test

Injection molding was carried out under conditions including a molding temperature of 220° C. and a mold cooling temperature of 50° C. by using an SE180D type injection molding machine manufactured by Sumitomo Heavy Industries, and thus there was produced a rectangular prism specimen being 400 mm in length, 100 mm in width and 3 mm in thickness and having no grain patterns.

Using a High Rate Impact Tester (RIT-8000 type) manufactured by Rheometrics (U.S.A.), a 100×100×3 (mm) flat piece cut out from a 100×400×3 (mm) injection molded plate was fixed with a 2-inch circular fixture under a −30° C. atmosphere. Using an impact probe ½ inches in diameter (its tip spherical surface had a radius of ¼ inches), the impact probe was put on a specimen at a speed of 5 m/sec to detect the amount of deformation of the specimen and the stress, and then surface impact strength (unit: J) was evaluated by calculating the integrated area of the amount of deformation and the stress.

(10) Shrinkage Anisotropy

Injection molding was carried out under conditions including a molding temperature of 220° C. and a mold cooling temperature of 50° C. by using an SE180D type injection molding machine manufactured by Sumitomo Heavy Industries, and thus there was produced a rectangular prism specimen being 400 mm in length, 100 mm in width and 3 mm in thickness (having a 400 mm×100 mm front surface with a grain pattern (i.e., a grained surface) and a 400 mm×100 mm rear specular surface).

This specimen was allowed to stand for 48 hours under a standard condition represented by a room temperature of 23° C. and a humidity of 50%, and then the lengths of the longitudinal direction (MD) and the transverse direction (TD) of this specimen were measured. The mold shrinkage of the longitudinal direction and the mold shrinkage of the transverse direction were calculated from the following formulae and the shrinkage anisotropy was further calculated.

$MD=((400-MD \text{ dimension})/400)\times 1000$ $TD=((100-TD \text{ dimension})/100)\times 1000$ Shrinkage anisotropy=MD/TD The closer to 1 the value of shrinkage anisotropy, the less likely the warpage of a molded article occurs.

(11) Average Particle Diameter of Talc (Unit: μm)

The average particle diameter is a 50% equivalent particle diameter D50 determined from an integral distribution curve of the sub-sieve method produced on the basis of values measured by a laser diffraction method using a microtrack particle size analyzer (SPA system) manufactured by Nikkiso Co., Ltd., after putting a sample in an ethanol solution and conducing dispersion for 10 minutes with an ultrasonic cleaner.

(12) Content of structural units derived from ethylene in Propylene-Ethylene Copolymer (Unit: % by Weight)

A sample was prepared by dissolving about 200 mg of a heterophasic polymeric material in 3 mL of a mixed solvent (orthodichlorobenzene/deuterated orthodichlorobenzene=4/1 (volume ratio)) homogeneously in a 10 mmϕ test tube, and a $^{13}$C-NMR spectrum of the sample was measured under the following conditions by using JNM-EX270 manufactured by JEOL Co., Ltd. From the $^{13}$C-NMR spectrum obtained, the content of the structural units derived from ethylene in a propylene-ethylene copolymer was calculated according to a report produced by Kakugo et al. (Macromolecules 1982, 15, 1150-1152).

<Measurement Conditions>
measurement temperature: 135° C.
pulse repetition time: 10 seconds,
pulse width: 450
transients: 2,500.

Example 1

The propylene polymeric material (A), the wollastonite (B), the elastomer (C), and talc-1 in the proportions given in Table 1, 0.4 parts by weight of NEUTRON-S, 0.05 parts by weight of calcium stearate, 0.05 parts by weight of SUMILIZER GA80, 0.10 parts by weight of SONGNOX 6260, 0.02 parts by weight of SUMILIZER TPM, 0.15 parts by weight of Uvinul 5050H, 0.08 parts by weight of Armowax EBS, and 6 parts by weight of a black pigment masterbatch were all mixed. The mixed raw materials were fed into a twin screw kneading machine TEX 44αII manufactured by Japan Steel Works, Ltd. through its most upstream raw material feeding port and then melt-kneaded under conditions including a cylinder temperature of 160° C., a discharge rate of 50 kg/h and a screw rotation speed of 200 rpm, affording pellets.

Injection molding was carried out using the resulting pellets and physical properties of the resulting molded article were evaluated. Moreover, the molded article was ashed at 550° C. and the fiber length of the wollastonite was measured from an SEM image. The number of the wollastonite measured was 689. Results are shown in Table 1.

Example 2

Operations were carried out in the same manner as in Example 1 except that the cylinder temperature of the kneading machine was adjusted to 200° C. The number of the wollastonite measured was 667. The results of physical property evaluation are shown in Table 1.

Example 3

Operations were carried out in the same manner as in Example 1 except that the cylinder temperature of the kneading machine was adjusted to 240° C. The number of the wollastonite measured was 659. The results of physical property evaluation are shown in Table 1.

Example 4

Operations were carried out in the same manner as in Example 2 except that the raw material talc was changed to "talc-2." The results of physical property evaluation are shown in Table 1.

Example 5

Operations were carried out in the same manner as in Example 1 except that a heterophasic polymeric material (A-2), a propylene homopolymer (A-3), and a propylene homopolymer (A-4) were used and these were blended in the proportions shown in Table 1. The results of physical property evaluation are shown in Table 1.

Example 6

Operations were carried out in the same manner as in Example 2 except that a heterophasic polymeric material (A-2), a propylene homopolymer (A-3), and a propylene homopolymer (A-4) were used and these were blended in the proportions shown in Table 1. The results of physical property evaluation are shown in Table 1.

Comparative Example 1

Operations were carried out in the same manner as in Example 1 except that the kneading machine of Example 1 was exchanged for a kneading machine (a 20 mm twin screw kneading machine manufactured by Toyo Seiki Seisaku-sho, Ltd.) different in screw combination from the kneading machine of Example 1, and melt-kneading was carried out under conditions including a cylinder temperature of 200° C., a discharge rate of 3 kg/h, and a screw rotation speed of 80 rpm to obtain pellets. The number of the wollastonite measured was 551. The results of physical property evaluation are shown in Table 1.

Comparative Example 2

Operations were carried out in the same manner as in Example 4 except that the blended amounts of wollastonite and talc-2 were changed to the percentages given in Table 1. The results of physical property evaluation are shown in Table 2.

Comparative Example 3

Operations were carried out in the same manner as in Example 4 except that the blended amounts of wollastonite and talc-2 were changed to the percentages given in Table 1. The results of physical property evaluation are shown in Table 2.

Comparative Example 4

Operations were carried out in the same manner as in Example 1 except that wollastonite was not used and only "talc-1" was used. The results of physical property evaluation are shown in Table 2.

Comparative Example 5

Operations were carried out in the same manner as in Example 1 except that the wollastonite was exchanged for fibrous magnesium oxysulfate. The results of physical property evaluation are shown in Table 2.

Comparative Example 6

Operations were carried out in the same manner as in Example 1 except that the wollastonite was exchanged for glass fiber. The results of physical property evaluation are shown in Table 2.

TABLE 1

| | Example 1 | Example 2 | Example 3 | Example 4 | Example 5 | Example 6 | Comparative Example 1 |
|---|---|---|---|---|---|---|---|
| (A-1) | 56 | 56 | 56 | 56 | | | 56 |
| (A-2) | | | | | 43 | 43 | |
| (A-3) | 3 | 3 | 3 | 3 | 17 | 17 | 3 |
| (A-4) | | | | | 10 | 10 | |
| (C-1) | 4 | 4 | 4 | 4 | 6 | 6 | 4 |
| (C-2) | 15 | 15 | 15 | 15 | 3 | 3 | 15 |
| (B-1) | 11 | 11 | 11 | 11 | 21 | 21 | 11 |
| Talc-1 | 11 | 11 | 11 | | | | 11 |
| Talc-2 | | | | 11 | | | |
| MOS-HIGE | | | | | | | |
| Glass fiber | | | | | | | |
| Cylinder temperature (° C.) of kneading machine | 160 | 200 | 240 | 200 | 160 | 200 | 200 |
| <Profile of wollastonite in molded article> | | | | | | | |
| Average fiber length (μm) | 19.9 | 19 | 25.9 | — | — | — | 26.4 |
| Percentage of fibers being 50 μm or more in length | 1.5 | 0.7 | 1.4 | — | — | — | 2.7 |
| Percentage of fibers being not less than 10 μm but less than 50 μm in length | 29.7 | 26.1 | 33.5 | — | — | — | 35.6 |
| Percentage of fibers being less than 10 μm in length | 68.8 | 73.2 | 65.1 | — | — | — | 61.7 |
| Average fiber diameter (μm) | 3.8 | 3.3 | 3.9 | — | — | — | 3.4 |
| <Physical properties> | | | | | | | |
| Gloss on specular surface | 47 | 45 | 44.7 | 43 | 43.9 | 37.6 | 43.8 |
| Gloss on grained surface | 1.30 | 1.30 | 1.30 | 1.30 | 1.28 | 1.24 | 1.30 |
| Scratch resistance | 1.60 | 1.62 | 1.60 | 1.60 | 1.54 | 1.54 | 1.60 |
| Tensile elongation | 441 | 49 | 39 | 53 | — | — | 38 |
| Surface impact strength | 12.7 | 10 | 8 | 6.9 | — | 6.3 | 3.9 |
| Shrinkage anisotropy | 0.73 | 0.71 | 0.69 | 0.74 | 0.74 | 0.69 | 0.68 |

TABLE 2

|  | Comparative example 2 | Comparative example 3 | Comparative example 4 | Comparative example 5 | Comparative example 6 |
|---|---|---|---|---|---|
| (A-1) | 56 | 56 | 56 | 56 | 56 |
| (A-2) |  |  |  |  |  |
| (A-3) | 3 | 4 | 4 | 4 | 3 |
| (A-4) |  |  |  |  |  |
| (C-1) | 3 | 3 | 3 | 4 | 4 |
| (C-2) | 15 | 15 | 15 | 15 | 15 |
| (B-1) | 7 | 4 |  |  |  |
| Talc-1 |  |  | 22 | 11 | 11 |
| Talc-2 | 15 | 18 |  |  |  |
| MOS-HIGE |  |  |  | 11 |  |
| Glass fiber |  |  |  |  | 11 |
| Cylinder temperature (° C.) of kneading machine | 200 | 200 | 160 | 160 | 160 |
| <Profile of wollastonite in molded article> | | | | | |
| Average fiber length (μm) | — | — | — | — | — |
| Percentage of fibers being 50 μm or more in length | — | — | — | — | — |
| Percentage of fibers being not less than 10 μm but less than 50 μm in length | — | — | — | — | — |
| Percentage of fibers being less than 10 μm in length | — | — | — | — | — |
| Average fiber diameter (μm) | — | — | — | — | — |
| <Physical properties> | | | | | |
| Gloss on specular surface | — | — | 51.2 | 49.6 | 48.6 |
| Gloss on grained surface | 1.44 | 1.42 | 1.50 | 1.30 | 1.30 |
| Scratch resistance | 1.84 | 1.84 | 1.86 | 1.60 | 1.58 |
| Tensile elongation | 50 | 49 | 43 | 42 | 15 |
| Surface impact strength | — | — | — | 7.8 | — |
| Shrinkage anisotropy | — | — | 0.82 | 0.64 | 0.63 |

What is claimed is:

1. A resin composition comprising 40% by weight to 90% by weight of a propylene polymeric material (A) containing 50% by weight or more of structural units derived from propylene, 9% by weight to 30% by weight of wollastonite (B), and 1% by weight to 30% by weight of an elastomer (C) where the combined amount of (A), (B) and (C) is taken as 100% by weight, wherein the wollastonite (B) satisfies the following requirement (1) and requirement (2), requirement (1): having an average fiber length of 10.0 μm to 26.0 μm requirement (2): having a fiber length distribution satisfying the following (b1), (b2) and (b3) where the overall number of the wollastonite is taken as 100%, (b1): the content of wollastonite having a fiber length of 50 μm or more is 0.1% to 3.0%

(b2): the content of wollastonite having a fiber length of not less than 10 μm but less than 50 μm is 17.0% to 35.0%

(b3): the content of wollastonite having a fiber length of less than 10 μm is 62.0% to 82.9%.

2. The resin composition according to claim 1, wherein the elastomer is an olefin-based elastomer having a melt flow rate of 0.05 g/10 minutes to 30 g/10 minutes as measured at a 230° C. under a load of 21.18 N in accordance with JIS K6758.

* * * * *